E. S. Drake,
Diamond Saw,
Nº 47,255.  Patented Apr. 11, 1865.

Witnesses;
S. B. Kidder
W. B. Gleason

Inventor;
Edwin S. Drake
By his atty
J. B. Crosby

UNITED STATES PATENT OFFICE.

EDWIN S. DRAKE, OF PORTLAND, MAINE.

IMPROVED SAW.

Specification forming part of Letters Patent No. 47,255, dated April 11, 1865.

*To all whom it may concern:*

Be it known that I, EDWIN S. DRAKE, of Portland, county of Cumberland, in the State of Maine, have invented a new and Improved Saw; and I do hereby declare that the following, taken in connection with the drawings, which accompany and form part of this specification, is a description of my invention sufficient to enable those skilled in the art to practice it.

In the ordinary operation of "sawing" stone, so called, it is well known that the process is not strictly a sawing one, but is rather a grinding operation, being performed by reciprocation or rotation of a "lap" of soft metal supplied with some loose, hard, powdered, or granulated substance—as emery or sand, for example—and being kept from heating by a supply of water or other suitable fluid. This process is at best but slow and tedious, although it is the only one practiced for dividing the softer stones—such as marble and freestone—which are not laminated and do not cleave with precision. To divide such stones into slabs with less expenditure of time than has heretofore been required is the object of my invention, which consists in a new article of manufacture, the same being a saw, in the plate or body of which, or in its teeth or projections from the body, shall be permanently fixed small precious stones of great hardness or pieces thereof (diamonds being preferred) in such a manner that said stones shall form the cutting edges or points of the saw, and so that some of them shall project on either side of the saw-plate, so as to cut a "kerf" enough wider than the thickness of the saw-plate to keep said plate from binding in the kerf or from coming into contact with the solid parts of the stone undergoing the cutting operation.

Figure 1:
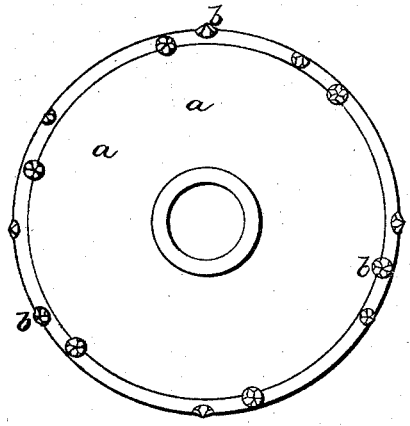
Figure 2:
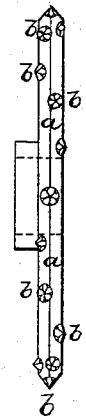

Referring to the drawings, Figure 1 is a side elevation of a saw embodying my invention, and Fig. 2 is an edge view thereof.

*a* denotes the plate of the saw, and *b* the diamonds or other precious stones which form the cutting edges or points thereof.

It will be seen on inspection of the drawings that some of the points *b* are arranged to cut the edges or side boundaries of the kerf, while others are arranged to cut the middle of it, and that there are others which cut in intermediate paths, the disposition of the points *b* being such as to cut away all the material opposed to the progression of the saw. To keep the points *b* and the plate *a* from heating during the performance of the sawing operation, a stream of cold water should be kept flowing upon the saw where in contact with the stone. Discolorations and specks and flaws, which detract from the value of diamonds and other precious stones, do not injure them for my proposed use, and it is such cheapened stones that I propose to employ.

There is nothing new about the mode of securing the stones in their places, they being embedded in copper in a manner well known to diamond setters, and this therefore needs no description.

I claim—

As a new article of manufacture, a saw constructed with cutting points or edges, substantially as described.

In witness whereof I have hereunto set my hand.

EDWIN S. DRAKE.

In presence of—
 E. McMANUS,
 LEVI F. DRAKE.